(12) United States Patent
Greenberger

(10) Patent No.: US 6,411,979 B1
(45) Date of Patent: Jun. 25, 2002

(54) COMPLEX NUMBER MULTIPLIER CIRCUIT

(75) Inventor: Alan Joel Greenberger, Allentown, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/333,071

(22) Filed: Jun. 14, 1999

(51) Int. Cl.[7] .................................................. G06F 7/52
(52) U.S. Cl. ...................................................... 708/622
(58) Field of Search ................................. 708/622, 628, 708/607

(56) References Cited

U.S. PATENT DOCUMENTS

| | | | | |
|---|---|---|---|---|
| 5,262,976 A | * | 11/1993 | Young et al. | 708/622 |
| 5,694,349 A | * | 12/1997 | Pal | 708/622 |
| 5,777,915 A | * | 7/1998 | Witte et al. | 708/622 |
| 6,038,583 A | * | 3/2000 | Oberman et al. | 708/628 |
| 6,122,654 A | * | 9/2000 | Zhou et al. | 708/622 |
| 6,237,016 B1 | * | 5/2001 | Fischer et al. | 708/622 |
| 6,272,512 B1 | * | 8/2001 | Golliver et al. | 708/622 |

* cited by examiner

Primary Examiner—David H. Malzahn

(57) ABSTRACT

A digital circuit for computing a function consisting of sums and differences of the products of a first vector of N multipliers and a second vector of M multiplicands, where at least one of N and M is greater than one include N multibit recoding circuits and M multiples generator circuits. Each recoding circuit receives a respective multiplier as input and produces a radix-$2^k$ signed digit representation of the multiplier as output. Each multiples generator receives a respective multiplicand as input and producing multiples of the multiplicand between one and $2^{k-1}$ as output. The output of N recoding circuits and M multiples generator circuits are fed to an N×M array of partial product summers. Each partial product summer produces a respective product output, the set of outputs of the partial product summers comprising the product of each of the multipliers with each of the multiplicands. At least one adder receives the product outputs of the partial product summers and produces a summed output corresponding to the function being computed.

6 Claims, 5 Drawing Sheets

COMPLEX NUMBER MULTIPLIER CIRCUIT

FIELD OF THE INVENTION

This invention is related to digital multipliers. More particularly, this invention is related to a digital multiplier which performs multiplication of complex numbers using a multi-bit recoding architecture.

BACKGROUND OF THE INVENTION

1. Multi-bit Recoding Multiplication

A widely used multiplier architecture uses multibit recoding of two's complement binary numbers to reduce the number of iterations required when performing a multiplication as a series of additions. A conventional generalized multibit recoding circuit 10 is illustrated in FIG. 1a. Conventional multibit recoding techniques are described in detail in H. Sam and A. Gupta, "A Generalized Multibit Recoding of Two's Complement Binary Numbers and Its Proof with Application in Multiplier Implementations", IEEE Trans. Comp., V. 39 #8, p. 1006, August 1990, the contents of which are hereby incorporated by reference.

In brief, to determine the product Z of a multiplier X and a multiplicand Y in this architecture, the multiplier X is provided to a recoder 12 which examines the multiplier k+1 bits at a time and generates a corresponding sequence of signed digit values. These recoded values represent the number of times the multiplicand will be added or subtracted after shifting to contribute to the final product. The signed digits have values between 0 and $+/-2^{k-1}$, where $2^k$ is the recoding radix. In conjunction with recoding the multiplier X, the multiplicand Y is input to a multiples generator 14 which produces output signals that represent multiples of the multiplicand Y from Y to $2^{(k-1)}Y$.

To perform the multiplication, each of the signed digits is used to select a particular multiple of Y, which is then shifted as necessary according to the "place" of the multiplier X that the signed digit represents in radix $2^k$ and then summed. The summation, which is performed by a partial product summer 16, can be in series or in parallel. Preferably, in the case of parallel summation, the shifting is hardwired.

In one implementation of the algorithm, a two's complement binary number X is recoded into a signed digit representation as follows. First, the sign bit of X is extended as many positions as necessary so that the total number of bits n in X is divisible by k. Then a 0 is appended to the right of the least-significant-bit of X, i.e., to the right of bit position 0. This appended bit is designated position −1. Next, vectors of k+1 bits are formed starting from bit $x_{-1}$ such that adjacent vectors share one bit. Each bit vector is converted into a signed digit according to the inner product of the bit vector with the vector $K=[-2^{k-1} 2^{k-2} \ldots 2^1 2^0 1]$. Generally, the possible inner products are predetermined and hardcoded in recoder 12, i.e., as a look-up table or hardwired logic, using techniques known to those skilled in the art. In the particular implementation of a radix 16 multi-bit recoding multiplier, five bits of the multiplier X are examined at once and recoded to control whether multiples of from one to eight of the multiplicand get added or subtracted to contribute to the final result after shifting by the appropriate multiple of k bits. A table of the signed digit values for a 5-Bit Recoding (k=4) follows:

TABLE 1

| Quintuplet Value | Signed Digit Value | Quintuplet Value | Signed Digit Value |
|---|---|---|---|
| 00000 | +0 | 10000 | −8 |
| 00001 | +1 | 10001 | −7 |
| 00010 | +1 | 10010 | −7 |
| 00011 | +2 | 10011 | −6 |
| 00100 | +2 | 10100 | −6 |
| 00101 | +3 | 10101 | −5 |
| 00110 | +3 | 10110 | −5 |
| 00111 | +4 | 10111 | −4 |
| 01000 | +4 | 11000 | −4 |
| 01001 | +5 | 11001 | −3 |
| 01010 | +5 | 11010 | −3 |
| 01011 | +6 | 11011 | −2 |
| 01100 | +6 | 11100 | −2 |
| 01101 | +7 | 11101 | −1 |
| 01110 | +7 | 11110 | −1 |
| 01111 | +8 | 11111 | 0 |

As also known to those of skill in the art, the multiples of the multiplicand can be determined using various techniques, such as combinations of shifts and adds. Only multiples of three, five, and seven times the multiplicand require any effort to determine since the multiples of two, four, and eight can be formed by shifts of the multiplicand, and the multiple of six can be formed by a shift of the multiple of three. In one implementation, the three, five, and seven multiples can be generated using a sequence of adders, i.e., 3Y=Y+2Y, 5Y=Y+4Y, and 7Y =8Y−Y.

In a radix 16 (i.e., k=4) multiplier circuit, a sixteen bit two's complement multiplier X gets recoded into four signed digits SD1–SD4, each of which indicates the addition or subtraction of zero or one of the eight multiples of the multiplicand. A block diagram of partial product adder 16 configured for a 16-bit multiplier and multiplicand using radix 16 encoding is illustrated in FIG. 1b. The various multiples of Y output by the multiples generator 14 are input to four multiplexers 18.1–18.4. Each signed digit SD1–SD4 controls a respective multiplexer to select the appropriate multiple of Y (i.e., 0 to 8Y). First and second adders 20, 22 each receive inputs from a respective pair of multiplexers, as shown. Adders 20, 22 also receive sign control signals in accordance with the sign of the signed digits which indicate whether the inputs are added to or subtracted from the partial product. The outputs of adders 20 and 22 are themselves combined by an adder 24 which outputs the final product Z. As indicated above, the outputs of each of the multiplexers must be shifted in accordance with the "place" that signed digit represents in base 16. This shift can be accomplished by shifting the bit positions in the hardwired connection between the output of the multiplexers and the input of the adders.

2. Complex Number Multiplication

Complex number multiplication is an increasingly common operation in Digital Signal Processing (DSP). To multiply two complex numbers, represented as $X_1+iY_1$ and $X_2+iY_2$, where "i" represents the square root of −1, the programmer typically breaks the computation up into $$(X_1+i\ Y_1)(X_2+i\ Y_2)=(X_1X_2-Y_1Y_2)+i(X_1Y_2+Y_1X_2) \quad \text{Equ. 1}$$

In a conventional DSP which has a single fixed point multiplier available, the four multiplications are performed sequentially and sums and differences are formed. For a typical programmable DSP, an addition or subtraction can be performed in parallel to the multiplication, with each of the multiplications or additions taking a cycle. More recently, programmable DSP integrated circuits have appeared that contain two or more multipliers operating in parallel. The multipliers are typically general purpose devices and each is a replica of the other. In a conventional multi-multiplier DSP, the same computation as when a single multiplier is available is performed, only it takes less time because more than one multiplication may be performed in parallel.

Attempts have been made to optimize specific Digital Signal Processing algorithms which perform complex number multiplication in hardware. In one configuration of such an Application Specific Integrated Circuit (ASIC) designed to implement Equation 1, four parallel multipliers are provided, similar to a conventional multi-multiplier DSP. The multipliers, which are copies of each other, calculate the four cross-products ($X_1X_2$, $Y_1Y_2$, $X_1Y_2$, $X_2Y_1$) in parallel. Two adders are provided, each connected to receive the outputs of a respective pair of multipliers. The adders combine the appropriate products to generate the real and imaginary components of the output. However, since each multiplier is replicated in its entirety, such a system requires a relatively large area of space in an integrated circuit to implement.

In another attempt, the complex multiplication performed is "decomposed" to reduce the number of required multiplications from four to three according to the alternate decomposition:

$$(X_1+iY_1)(X_2+iY_2) = ((X_1-Y_1)Y_2 + X_1(X_2-Y_2)) + i((X_1-Y_1)Y_2 + Y_1(X_2+Y_2)) \quad \text{Equ. 2}$$

The term $(X_1-Y_1)Y_2$ appears twice on the right hand side, hence only three multiplications are required. However, the price paid for this configuration is the need for more adders. Further, some of the adders have to perform before the multiplication and some after, resulting in a longer latency for the entire computation. Hence, this technique has only proved practical on architectures where time for multiplication is much longer than the time for addition.

Accordingly, it would be advantageous to provide a multiplication circuit architecture which efficiently performs complex multiplication but requires less area in an integrated circuit than conventional architectures.

SUMMARY OF THE INVENTION

Due to improvements in fabrication technology, various new applications are becoming important aspects of Digital Signal Processing. Many of these application make use of complex multiplications, often of large arrays of numbers. An important application is adaptive beamforming for arrays of antennas in a base station for wireless telephones which adding together the signals received by multiple antennas with time varying complex weights in order to form a radiation pattern pointing toward the mobile phone of interest, and putting nulls on sources of interference. Various solutions for optimizing this type of problem are known and involve performing complex number multiplication on matrices and vectors of data. Thus, instead of only a single complex multiplication being called for at a given time, there is the need for massive numbers of complex multiplications. In some cases, the multiplicands are not entirely independent, but may be reused many times with different values of multiplier or the reverse, where the multipliers are reused with different values of multiplicand.

The inventor has recognized that many common complex multiplications which are routinely performed in parallel using conventional DSP architectures have a high degree of redundancy. This redundancy can be exploited to minimize the hardware needed to perform the computation. Unlike conventional systems in which a multiplier is replicated several times to provide for parallel computations, a complex number multiplier according to the invention extends the architecture of a conventional multi-bit recoding multiplier to take advantage of this redundancy. In particular, a complex number multiplier according to the invention determines the recoding or multiples for each unique factor in the multiplication, as opposed to determining these values for each multiplication which occurs in evaluating a given equation.

More specifically, in a parallel multiplication of complex numbers, two multi-bit recoders are provided to recode the real and imaginary components $X_{nR}$ and $X_{nI}$ of each unique complex multiplier $X_n$. Similarly, for each unique complex multiplicand, $Y_m$, two multiple generator subcircuits are provided to generate multiples of the real part $Y_{mR}$ and imaginary part $Y_{mI}$ of the multiplicand, respectively.

A partial product summer is provided for each cross product which is to be evaluated and is driven by the appropriate recoded multiplier digits and multiplicand multiples for the unique factors. According to one aspect of the invention, at least one of the unique factors appears in more than one cross product. Because there is only one recoder or multiples generator for that factor, less area is required to implement the circuit than in conventional architectures which replicate the entire multiplier circuit structure for each parallel multiplication. The outputs of the partial product summers are combined using appropriately configured adders to produce the desired complex number(s) solution.

For example, a conventional DSP may utilize 4 parallel multipliers to evaluate in parallel the four cross-products $X_1X_2$, $Y_1Y_2$, $X_1Y_2$, $X_2Y_1$, of Equation 1, above. Such a DSP requires four separate multiplier circuits and thus a relatively large area. Even if a multi-bit recoding multiplier of the type shown in FIG. 1a is used, the circuit resulting parallel multiplier circuit will still require four separate recoders 12 and four separate multiples generators 14 (i.e., one pair of each for each multiplier). In contrast, a circuit according to the invention configured to evaluate Equation 1, utilizes only two recoders, for multipliers $X_1$ and $X_2$, and only two multiples generators, for multiplicands $Y_1$ and $Y_2$, resulting in a substantial area and complexity savings. Because fewer recoders and multiples generators are needed in the circuit of the invention, more area can be dedicated to the recoders and multiples generators, allowing a higher radix to be used and a concurrently simpler and smaller adder tree in the partial product subcircuit. The area saved when compared to conventional increases for more extensive calculations, such as a circuit configured to evaluate two complex multiplications which require 16 cross products to be evaluated.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

A complex number multiplier circuit according to the invention extends the architecture of a conventional multi-bit recoding multiplier circuit to take advantage of redundancy present in the multiplication of complex numbers. In particular, a complex number multiplier circuit according to the invention determines the recoding or the multiples for each unique factor in the multiplication only once, regardless of the number of times the factor is used in the parallel multiplication. The recoded inputs and generated multiples are then applied to an array of partial product summers which generate the desired set of cross products. The cross products are combined as needed using a plurality of adders to generate the real and imaginary components of the output value.

In one embodiment of the invention, a complex number multiplier circuit is configured to evaluate $Z=X_1 Y_1$, where $X_1$ and $Y_1$ are both complex numbers. The complex number $X_1$ comprises a real component $X_{1R}$ and an imaginary component $X_{1I}$. Similarly, the complex number $Y_1$ comprises a real component $Y_{1R}$ and an imaginary component $Y_{1I}$. The complex product Z of the multiplication comprises a real component equal to $(X_{1R} Y_{1R} - X_{1I} Y_{1I})$ and an imaginary equal to $(X_{1R} Y_{1I} + X_{1I} Y_{1R})$. The four multiplications can be illustrated by the cross-product grid shown below in Table 2:

TABLE 2

|  | $Y_{1R}$ | $Y_{1I}$ |
|---|---|---|
| $X_{1R}$ | $X_{1R} Y_{1R}$ | $X_{1R} Y_{1I}$ |
| $X_{1I}$ | $X_{1I} Y_{1R}$ | $X_{1I} Y_{1I}$ |

As can be appreciated, each multiplier $X_{1R}$ and $X_{1I}$ and each multiplicand $Y_{1R}$ and $Y_{1I}$ appears in two product cells.

Figure 2:
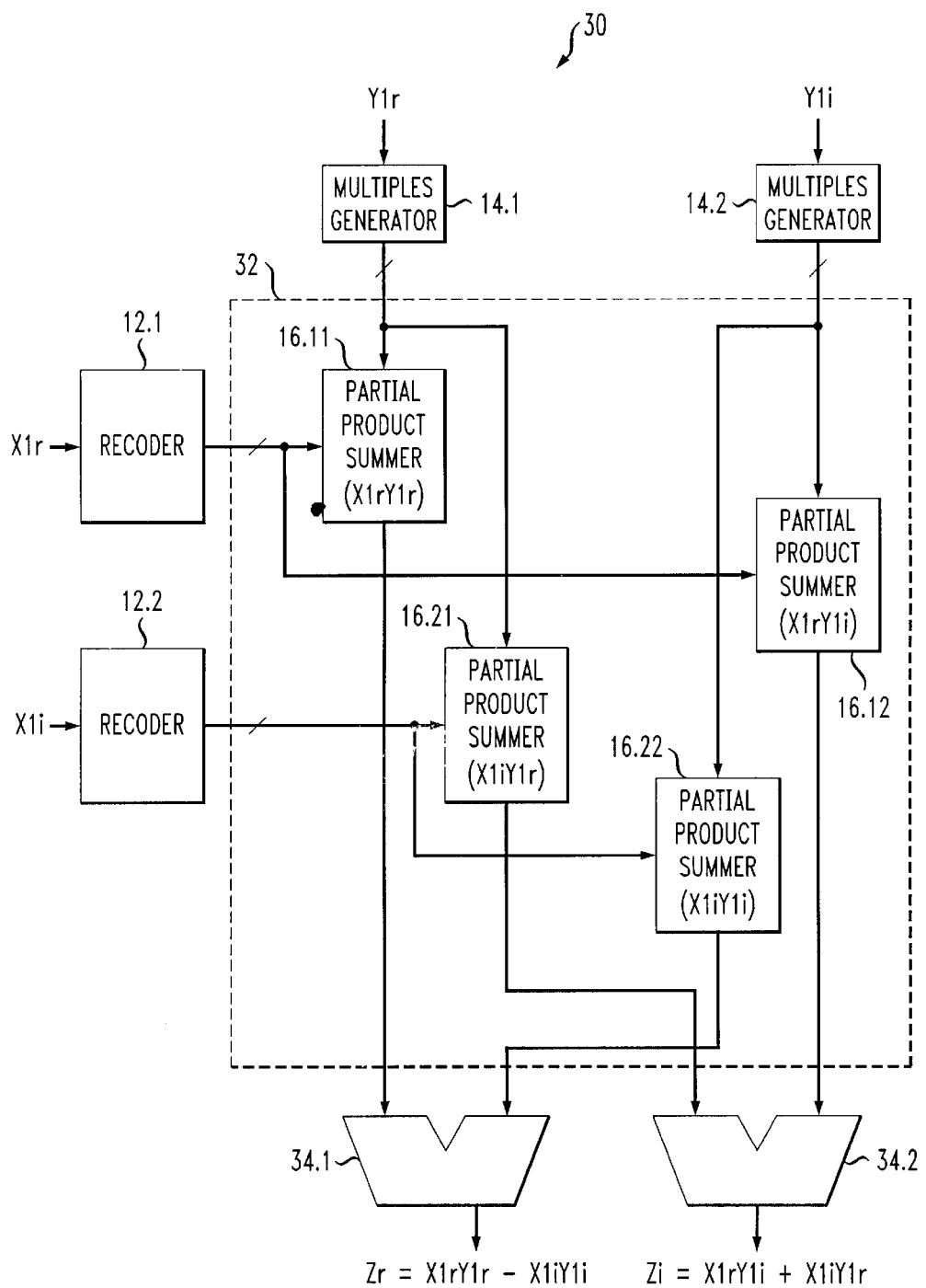
FIG. 2 is a block diagram of a multiplier circuit according to a first aspect of the invention.

FIG. 2 is a block diagram of a complex multiplier circuit 30 which, according to one embodiment of the invention, implements the cross-product grid of Table 2. The circuit comprises a pair of recoder circuits 12.1, 12.2 providing as output signed digits corresponding to the real and imaginary components of the input multiplier $X_1$. The circuit further comprises a pair of multiples generators 14.1, 14.2 providing as output the multiples of the real and imaginary components of the input multiplicand $Y_1$.

The number of signed digits generated and multiples generated depends upon the number of bits in each component of the factors and the recoding radix. For a system operating on complex numbers having two 16-bit two's compliment components, the recoder implements a 5-bit radix 16 recoding as detailed in Table 1, above, which produces 4 signed digits output signals. Preferably, the signed digit outputs are provided in parallel. However, a serial implementation may also be used, as will be known to those of skill in the art, with the use of additional control circuitry. In a radix 16 recoding, the multiples generators 14.1, 14.2 provide multiples of the respective input multiplicand from 1× to 8×, as discussed above.

Figure 1A:
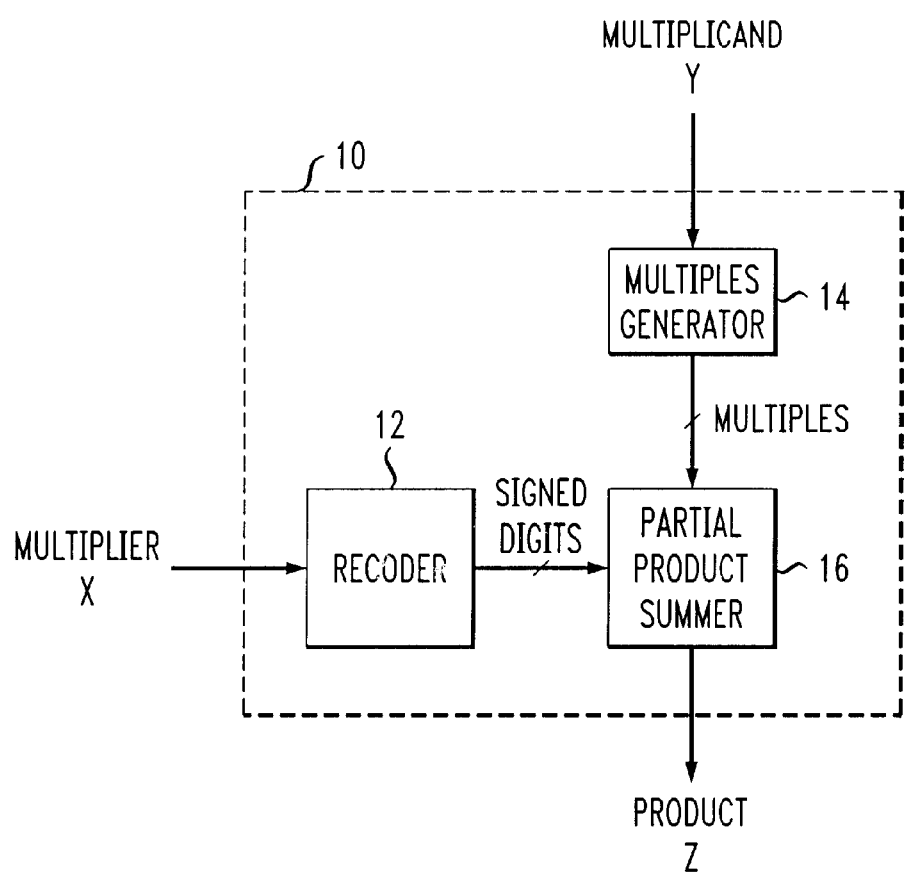
FIG. 1a is a block diagram of a conventional generalized multi-bit recoding multiplier circuit.
Figure 1B:
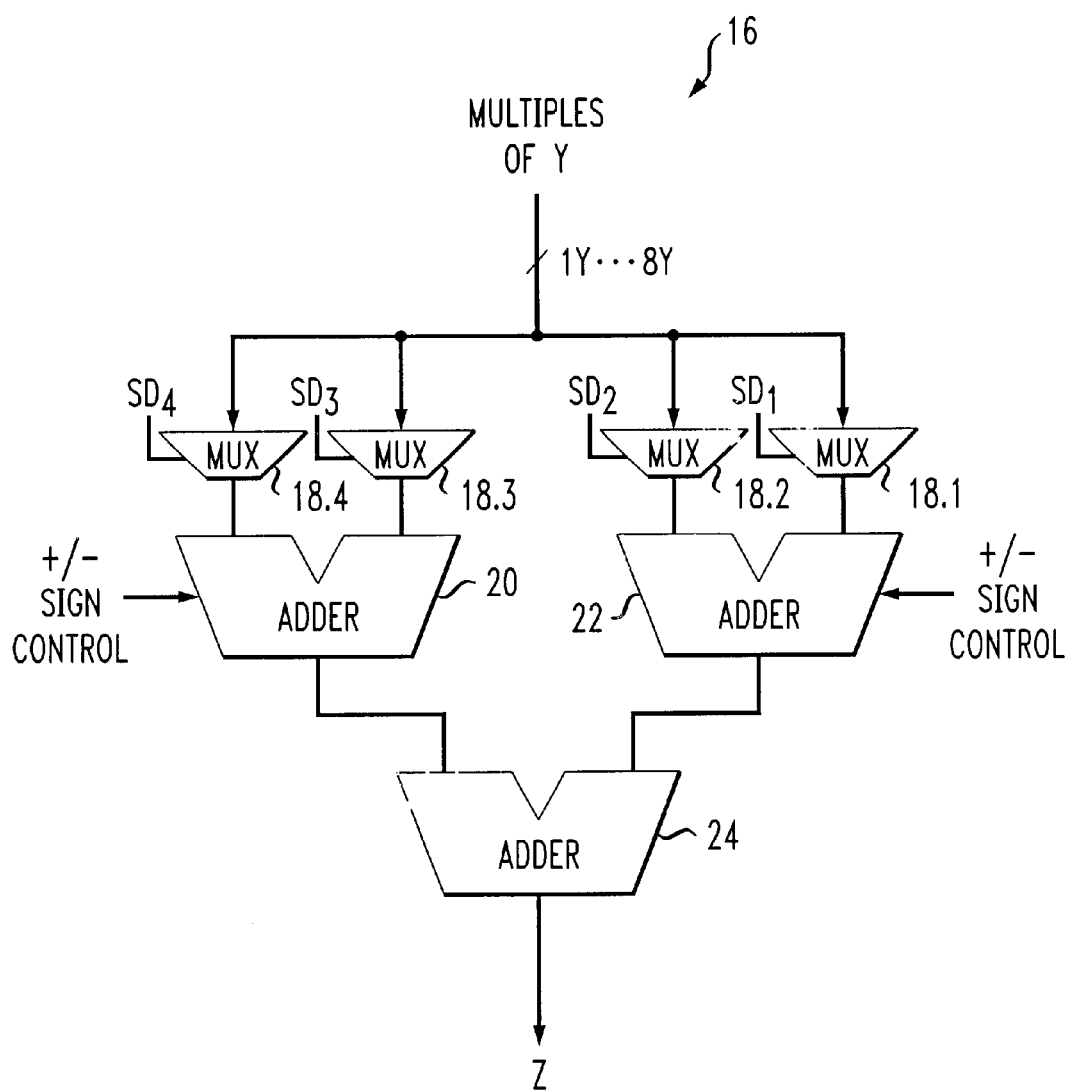
FIG. 1b is a block diagram of a particular partial product summer for use in the circuit of FIG. 1a with a 16-bit multiplier and where k=4.

The outputs of the recoders 12.1, 12.2 and the multiples generators 14.1, 14.2 are applied to a partial product summer array 32, comprising partial product summers, such as a multiplier parallel summer 16 discussed above with respect to FIG. 1. Each partial product summer is associated with a particular cross-product from the complex multiplication and is driven by the appropriate recoder and multiples generator. For example, partial product summer 16.11 corresponds to the cross-product $X_{1R} Y_{1R}$ and is driven by recoder 12.1, which generates signed digits for $X_{1R}$, and by multiples generator 14.1, which generates the multiples for $Y_{1R}$. In this manner, all four products required to complete the complex multiplication are generated.

The outputs of the partial product summers 16 can be combined using appropriately configured adders 34.1, 34.2 to produce the real and imaginary components of the complex number product Z. Because each recoder and multiples generator circuit drives more than one partial product summer, the area required to implement the complete complex multiplier circuit 30 is significantly reduced when compared with a conventional parallel multi-bit recoding multiplier having a separate recoder and a separate multiples generator for each of the partial product summers.

An increasingly common complex multiplication being performed in DSPs, for applications such as adaptive beam-forming for arrays of antennas, is the solution of linear matrix equations using Givens rotations. In this case, a unitary transformation is applied to a matrix of numbers, which transformation only affects two rows of that matrix at a time. The new values in the same column of two rows are given as combinations of the previous values multiplied by two common complex values, C and S, and their complex conjugates. Thus, determining the solution of the equations involve many complex computations of the form of:

$$Z_{ij} = C A_{ij} - S A_{i+1j}$$
$$Z_{i+1j} = S^* A_{ij} + C^* A_{i+1j}$$

Equ. 3 where $C=X_1=X_{1R}+iX_{1I}$, $S=X_2=X_{2R}+iX_{2I}$, $A_{ij}=Y1=Y_{1R}+iY_{1I}$, and $A_{i+1j}=Y_2=Y_{2R}=iY_{2I}$, respectively, and where the "*" operator indicates a complex conjugate, i.e., $C^*=X_{1R}-iX_{1I}$. The four complex multiplications called for in the two Equation 3 above are not completely independent but share common terms. The 16 multiplications required to evaluate Equation 3 can be represented in the cross-product grid shown below in Table 3:

TABLE 3

|  | $Y_{1R}$ | $Y_{1I}$ | $Y_{2R}$ | $Y_{2I}$ |
|---|---|---|---|---|
| $X_{1R}$ | $X_{1R}Y_{1R}$ | $X_{1R}Y_{1I}$ | $X_{1R}Y_{2R}$ | $X_{1R}Y_{2I}$ |
| $X_{1I}$ | $X_{1I}Y_{1R}$ | $X_{1I}Y_{1I}$ | $X_{1I}Y_{2R}$ | $X_{1I}Y_{2I}$ |
| $X_{2R}$ | $X_{2R}Y_{1R}$ | $X_{2R}Y_{1I}$ | $X_{2R}Y_{2R}$ | $X_{2R}Y_{2I}$ |
| $X_{2I}$ | $X_{2I}Y_{1R}$ | $X_{2I}Y_{1I}$ | $X_{2I}Y_{2R}$ | $X_{2I}Y_{2I}$ |

Each of the four multiplicands and four multipliers are used four times.

Figure 3:
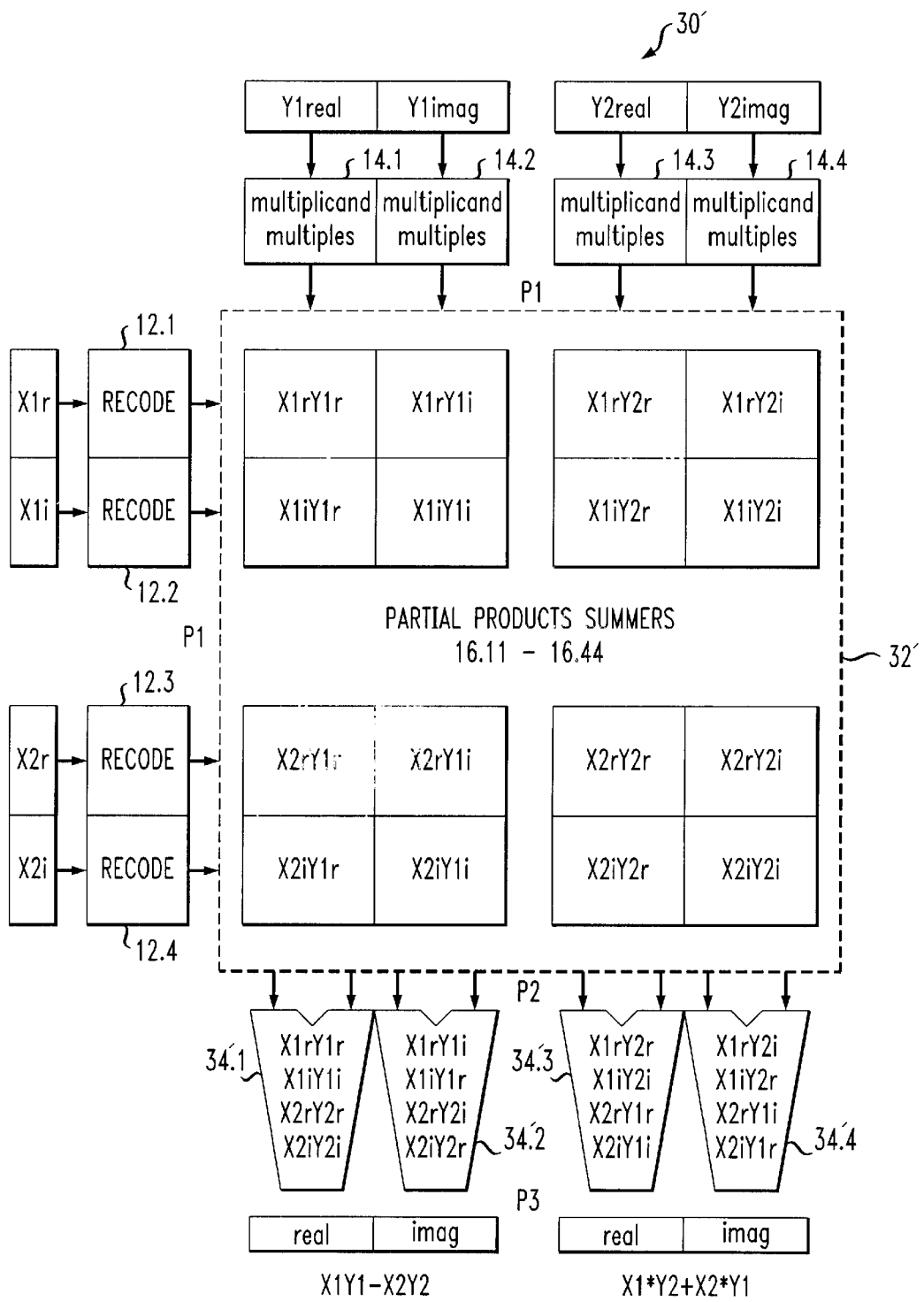
FIG. 3 is a block diagram of a multiplier circuit according to a second aspect of the invention.

FIG. 3 is a block diagram of a complex multiplier circuit 30' according to another embodiment of the invention which implements the cross-product grid of Table 3 and determines the values of $Z_{ij}$ and $Z_{i+1j}$ of Equ. 3, above. Each component of the unique multipliers $X_1$, $X_2$ is applied to respective recoder circuit 12.1–12.4 and each component of the unique multiplicands $Y_1$, $Y_2$ is applied to a respective multiples generator 14.1–14.4. The outputs of the recoders 12.1–12.4 and multiples generators 14.1–14.4 are applied to a partial product summer array 32', comprising 16 partial product summers 16.11–16.44, each of which is associated with a particular cross-product from the complex multiplication of Equation 3. At the bottom of FIG. 3 are the final adders 34'.1–34'.4 that receive the appropriate partial products and add or subtract them to form the final values for the results of Equation 3.

Although the adders in circuit 30' are illustrated as evaluating only Equation 3, in a more general implementation, the partial product summer outputs can be routed to any of the adders according to appropriate control signals to permit more general complex number calculations. The same is true for the circuit 30 of FIG. 2. However, when large numbers of partial products are at issue, a relatively large area may be required for the necessary wiring. Also shown in FIG. 3 are the symbols P1, P2, and P3. These indicate appropriate points for pipeline stages to improve the throughput of the multiplier.

The embodiment of the invention shown in FIG. 3 uses sixteen subcircuits for forming the partial products. If further cost reduction were desired, possibly at the expense of speed, the functions of these sixteen circuits could be performed serially by a single circuit which would form each of the sixteen partial products sequentially in time. This technique can be extended to the multiplication of a larger number of multipliers times a larger number of multiplicands with increasing hardware savings per multiply.

While the description of the invention has focused on complex multiplication, one can notice from FIG. 3, a variation of the above technique can be used to perform extended precision computations. For example, a real thirty-two bit by thirty-two bit multiplication can be broken down into four sixteen bit by sixteen bit partial products which are then shifted and summed to form the total product. In addition, while the description has focused on multiplying multiple complex multipliers by multiple complex multiplicands, if some or all of these values are real rather than complex, a similar technique can be used, omitting the hardware for forming some of the partial products and some of the final adders, as needed.

Figure 4:
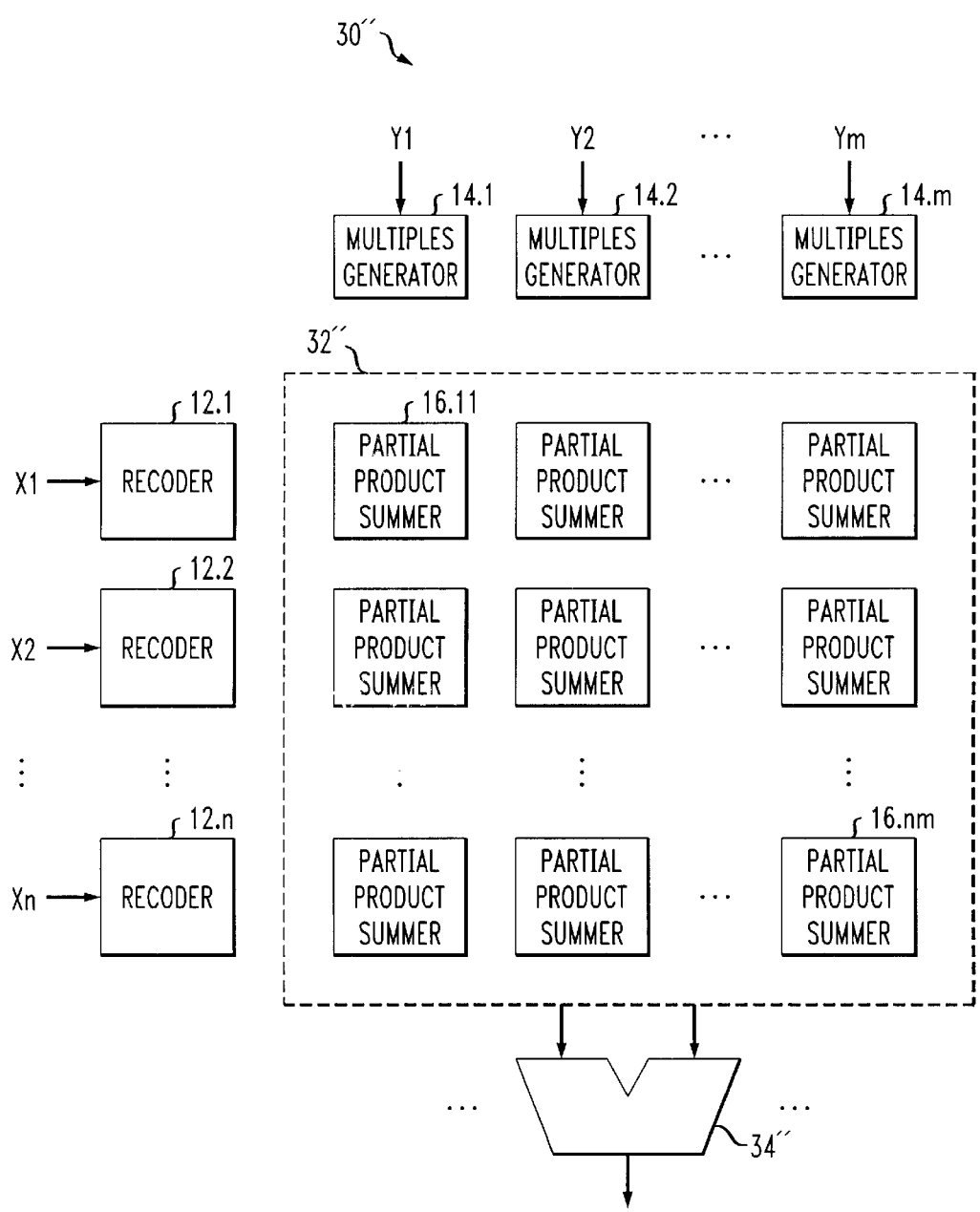
FIG. 4 is an A block diagram of a generalized multiplier circuit according to the invention.

A block diagram of a generalized multiplier circuit 30" according to the invention is shown in FIG. 4. The multiplier circuit 30" is configured to determine the product of a first vector of numbers $(X_1, X_2, \ldots, X_N)$ and a second vector of numbers $(Y_1, Y_2, \ldots, Y_M)$, where at least one of N and M is greater than 1. Each element of the first vector is applied to a respective recoder 12.1, ..., 12.N and each element of the second vector is applied to a respective multiples generator 14.1, ..., 14.M. The outputs of the recoders 12 and multiples generators 14 are applied to an N×M array of partial product summers 16 which produce N×M products. The products can be added or subtracted together as desired, e.g., by using adder 34", to produce the desired result. For example, if the elements of both vectors represent real numbers, all of the N×M products can be summed, e.g., by adder 34", to determine the value of $Z = (X_1 + X_2 + \ldots + X_N)(Y_1 + Y_2 + \ldots + Y_M)$. If some or all of the elements in the vectors represent real and imaginary components of complex numbers, various combinations of sums and differences can be generated to provide output values representing the products of complex multiplications, such as Equations 1 and 3, above.

While the invention has been particularly shown and described with reference to preferred embodiments thereof, it will be understood by those skilled in the art that various changes in form and details may be made therein without departing from the spirit and scope of the invention.

I claim:

1. A digital circuit for computing a function consisting of sums and differences of the products of a first vector of N multipliers and a second vector of M multiplicands, at least one of N and M being greater than one, said circuit comprising:

N multibit recoding circuits each receiving a respective multiplier as input and producing a radix-$2^k$ signed digit representation of the respective multiplier as output;

M multiples generator circuits each receiving a respective multiplicand as input and producing multiples of the respective multiplicand between one and $2^{k-1}$ as output;

N×M partial product summers, the signed digit output of each said recoding circuit being uniquely applied to M partial product summers, the multiples output of each said multiples generator circuit being uniquely applied to N partial product summers, wherein each partial product summer produces a respective product output, the set of outputs of said N×M partial product summers comprising the product of each of the multipliers with each of the multiplicands; and at least one adder receiving the product outputs of two or more of the partial product summers and producing a summed output.

2. The circuit of claim 1, wherein:

N is even and the N multipliers of said first vector represent real and imaginary components of N/2 complex number multipliers;

M is even and the M multiplicands of said second vector represent real and imaginary components of M/2 complex number multiplicands;

said at least one adder comprising a first adder combining a first set of said N×M products to produce a real part of a complex output and a second adder combining a second set of said N×M products to produce an imaginary part of said complex output.

3. The circuit of claim 2, wherein:

N equals 2, said first vector comprises a single complex multiplier X having a real component $X_R$ and an imaginary component $X_I$;

M equals 2, said second vector comprises a single complex multiplicand Y having a real component $Y_R$ and an imaginary component $Y_I$;

said partial product summers producing the products $X_R Y_R$, $X_I Y_I$, $X_R Y_I$, and $X_I Y_R$ as outputs;

said first adder receiving the products $X_R Y_R$ and $X_I Y_I$, as input and generating the real component of XY, as output; and said second adder receiving the products $X_R Y_I$ and $X_I Y_R$ as inputs and generating the imaginary component of XY, as output.

4. The circuit of claim 2, wherein:

N equals 4, said first vector comprises a first and second complex multipliers $X_1$ and $X_2$ having real components $X_{1R}$ and $X_{2R}$ and imaginary components $X_{1I}$ and $X_{2I}$, respectively;

M equals 4, said second vector comprises a first and second complex multiplicand $Y_1$ and $Y_2$ having real components $Y_{1R}$ and $Y_{2R}$ and imaginary components $Y_{1I}$ and $Y_{2I}$, respectively;

said first adder receiving products $X_{1R}Y_{1R}$, $X_{1I}Y_{1I}$, $X_{2R}Y_{2R}$, and $X_{2I}Y_{2I}$ as input and generating the real component of $X_1Y_1 - X_2Y_2$ as output;

said second adder receiving products $X_{1R}Y_{1I}$, $X_{1I}Y_{1R}$, $X_{2R}Y_{2I}$, and $X_{2I}Y_{2R}$ as input and generating the imaginary component of $X_1Y_1 - X_2Y_2$ as output;

said at least one adder further comprising;

a third adder receiving products $X_{1R}Y_{2R}$, $X_{1I}Y_{2I}$, $X_{2R}Y_{1R}$, and $X_{2I}Y_{1I}$ as input and generating the real component of $X_1^* Y_2 + X_2^* Y_1$ as output; and a fourth adder receiving products $X_{1R}Y_{2I}$, $X_{1I}Y_{2R}$, $X_{2R}Y_{1I}$, and $X_{2I}Y_{1R}$ as input and generating the imaginary component of $X_1^* Y_2 + X_2^* Y_1$ as output.

5. An integrated circuit including a circuit for computing a function consisting of sums and differences of the products of a first vector of N multipliers and a second vector of M multiplicands, at least one of N and M being greater than one, said integrated circuit comprising:

N multibit recoding circuits each receiving a respective multiplier as input and producing a radix–$2^k$ signed digit representation of the respective multiplier as output;

M multiples generator circuits each receiving a respective multiplicand as input and producing multiples of the respective multiplicand between one and $2^{k-1}$ as output;

N×M partial product summers, the signed digit output of each said recoding circuit being uniquely applied to M partial product summers, the multiples output of each said multiples generator circuit being uniquely applied to N partial product summers, wherein each partial product summer produces a respective product output, the set of outputs of said N×M partial product summers comprising the product of each of the multipliers with each of the multiplicands; and at least one adder receiving the product outputs of two or more of the partial product summers and producing a summed output.

6. The integrated circuit of claim 5, wherein:

N is even and the N multipliers of said first vector represent real and imaginary components of N/2 complex number multipliers;

M is even and the M multiplicands of said second vector represent real and imaginary components of M/2 complex number multiplicands;

said at least one adder comprising a first adder combining a first set of said N×M products to produce a real part of a complex output and a second adder combining a second set of said N×M products to produce an imaginary part of said complex output.

* * * * *